United States Patent
Steinwender

(10) Patent No.: US 7,870,939 B2
(45) Date of Patent: Jan. 18, 2011

(54) MAGNETORHEOLOGICAL CLUTCH

(75) Inventor: Herbert Steinwender, Raaba (AT)

(73) Assignee: MAGNA Drivetrain AG & Co KG, Lannach (AT)

( * ) Notice: Subject to any disclaimer, the term of this patent is extended or adjusted under 35 U.S.C. 154(b) by 675 days.

(21) Appl. No.: 11/884,693

(22) PCT Filed: Feb. 21, 2005

(86) PCT No.: PCT/AT2005/000052

§ 371 (c)(1),
(2), (4) Date: Nov. 7, 2007

(87) PCT Pub. No.: WO2006/086807

PCT Pub. Date: Aug. 24, 2006

(65) Prior Publication Data

US 2009/0205917 A1     Aug. 20, 2009

(51) Int. Cl.
F16D 37/02 (2006.01)
F16D 35/00 (2006.01)

(52) U.S. Cl. .................................................. 192/21.5
(58) Field of Classification Search ................ 192/21.5
See application file for complete search history.

(56) References Cited

U.S. PATENT DOCUMENTS

| 2,925,896 | A | | 2/1960 | Jaeschke |
| 5,667,715 | A | * | 9/1997 | Foister .................... 252/62.52 |
| 5,823,309 | A | | 10/1998 | Gopalswamy et al. |
| 5,845,753 | A | | 12/1998 | Bansbach |

(Continued)

FOREIGN PATENT DOCUMENTS

EP        0 879 973 A1        11/1998

(Continued)

OTHER PUBLICATIONS

Dennis Kampen, "Weichmagnetische Werkstoffe," IALB—Institut Fur Antriebstechnik, Leistungselektronik Und Bauelemente, 'Online! pp. 1-27, XP-002349048, Retrieved from the Internet: URL:http://www-user.uni-bremen.de/{glab/pdf/ WeichmagnetischeWerkstoffe.pdf> 'retrieved on Oct. 12, 2005! p. 20, col. 21 (with English language abstract).

(Continued)

*Primary Examiner*—Rodney H Bonck
(74) *Attorney, Agent, or Firm*—Harness, Dickey & Pierce, P.L.C.

(57) ABSTRACT

A magnetorheologic clutch includes a stationary part, a rotatable primary part having primary discs, a secondary part having secondary discs, and a chamber containing magnetorheologic fluid formed between the primary and secondary parts that is exposed to an adjustable magnetic field. To make a magnetorheologic clutch as small as possible which is capable of transmitting a peak torque at a minimum power consumption and which is easily controlled, at least one magnet coil is axially arranged before or after the discs and encompasses a first U-shaped cylinder head whose two surfaces are arranged on the side of the discs in a parallel thereto. A second cylinder head is disposed on the side of the discs opposite with respect to the first cylinder head. Areas of the secondary part are radially disposed inside and outside the discs which are made of a low-permeability magnetic material.

17 Claims, 7 Drawing Sheets

Figure 1:
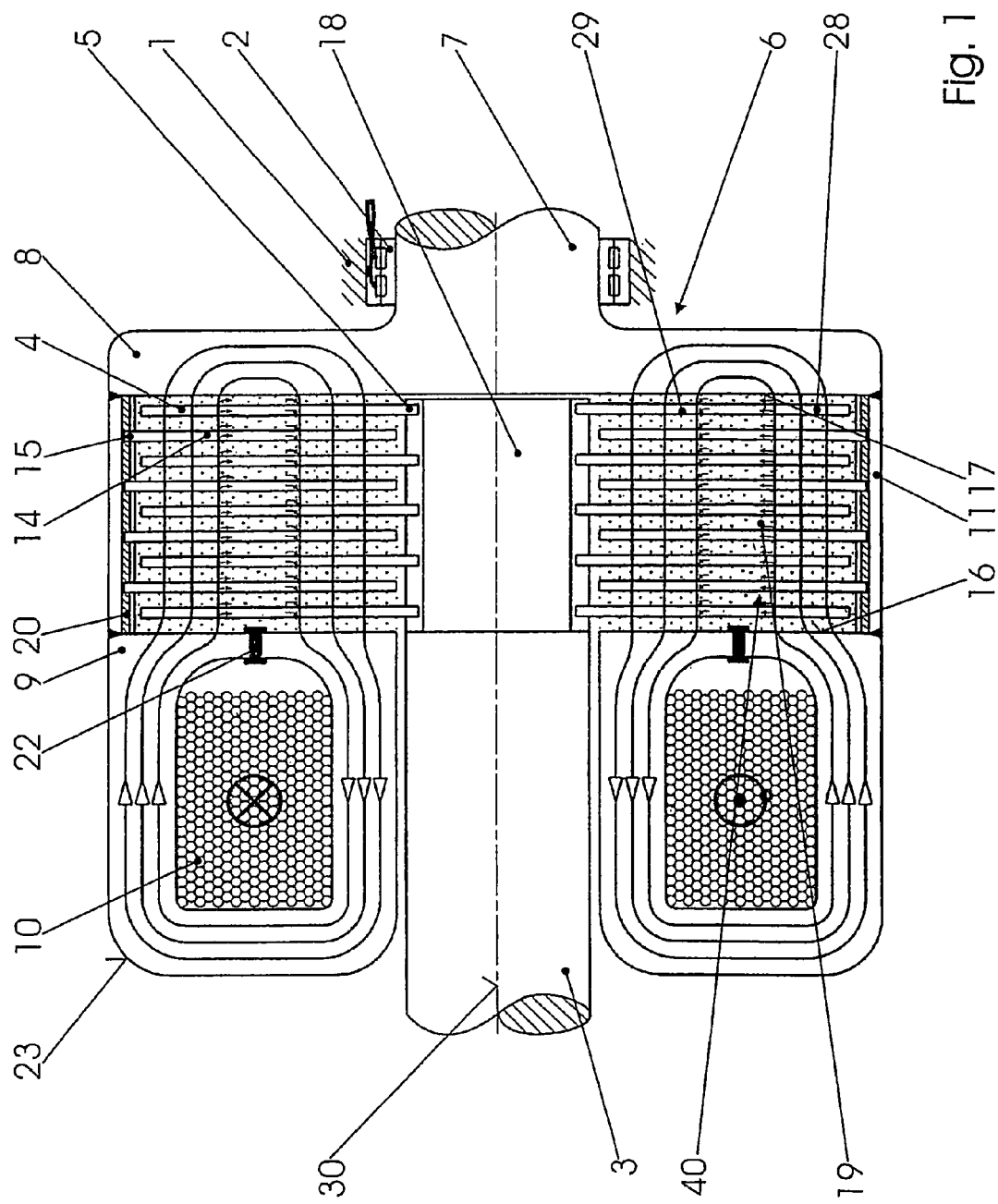

U.S. PATENT DOCUMENTS 6,552,639 B2 * 4/2003 Decristofaro et al. ....... 335/216
7,225,905 B2 * 6/2007 Namuduri et al. ........ 188/267.1

FOREIGN PATENT DOCUMENTS

| EP | 0 940 286 A2 | 9/1999 |
| WO | WO 2004/018889 A1 * | 3/2004 |
| WO | 2004/040157 A1 | 5/2004 |

OTHER PUBLICATIONS

Group Arnold: "Soft Magnetics Application Guide," Internet Article, 'Online! Mar. 2000, pp. 30.1-30.37, XP-002349049 Retrieved from the Internet: URL:http://www.allegromicro.com/techpub2/arnold/coretran.pdf> 'retrieved on Oct. 12, 2005!, p. 30.6.

* cited by examiner

MAGNETORHEOLOGICAL CLUTCH

CROSS-REFERENCE TO RELATED APPLICATIONS

This application is A National Stage of International application No. PCT/AT2005/000052, filed Feb. 21, 2005. The disclosure of the above application is incorporated herein by reference.

FIELD

The invention relates to magnetorheological clutches which comprise a stationary part, a rotatable primary part having primary discs and a secondary part having secondary discs which surrounds the primary part and is rotatable about a common axis of rotation, wherein a space containing a magnetorheological fluid is formed between the primary part and the secondary part in which the primary discs and the secondary discs alternate following one another in the axial direction and wherein at least one magnet coil generates a magnetic field of regulatable field strength which acts on the magnetorheological fluid.

BACKGROUND

For the use of a coupling of this kind in the drive train of a motor vehicle the current consumption and the constructional size are critical and must thus to be minimized. In addition to this further demands arise: A range of regulation of the torque to be transmitted that is so wide that, on the one hand, slip-free starting from stop and, on the other hand, full separation (also) for noise reasons is possible and finally rapid response in order to be compatible with electronic dynamic drive regulating systems (ESB, ABS, etc.).

Thus a clutch of the initially named kind is known from U.S. Pat. No. 5,845,753 in which the yoke extends from an end face on one side of the clutch externally surrounding latter up to a second end face at the other side of the clutch. This not only increases the diameter and weight but also signifies a large mass to be magnetized which consumes much current and leads to the breaking down of the magnetic field prior to release of the clutch taking too long for a useful control in the drive train of a motor vehicle. Moreover, the magnetic field lines which pass through the space filled with the magnetorheological fluid are of low density and very irregularly distributed.

Furthermore, a clutch of the said kind is known from EP 940 286 A2 (FIGS. 5 and 6) in which two yokes, of which one is provided with a magnet coil form an end face parallel to the discs on both sides of the clutch. The magnetic field passes through the discs and indeed in the external region in a magnetic flux direction and in the interior region in the opposite direction. Correspondingly the discs are separated from one another by zones of small magnetic permeability extending in the peripheral direction in order to prevent a magnetic short circuit. These zones could be provided by complicated and thus costly metallurgical measures. In practice there are however slits which weaken the discs in the peripheral direction and in the centrifugal direction. That is undesirable for a clutch in the drive train of a motor vehicle.

SUMMARY

It is the object of the invention to provide a magnetorheological clutch which avoids the disadvantages of the prior art and satisfies the above-named requirements of the modern motor vehicle. It should be of the smallest possible construction, above all in diameter, be able to transmit a maximum torque for a minimum of current consumption, be robust and be readily controllable.

In accordance with the invention, in a magnetorheological clutch, in which at least one magnet coil is arranged in the axial direction in front of or behind the space containing a magnetorheological fluid and builds up a magnetic field in a first yoke, in which the first yoke has an end face parallel to the discs which are adjoined by a space containing a magnetorheological fluid, wherein the magnetic field lines emerge substantially at right angles from this end face and in which at least one second yoke having an end face parallel to the discs is provided at the side of the space remote from the first yoke, the discs are plates which consist of a material having a magnetic permeability in the range from 0.6 to 1.2 Tesla which also lies approximately in the middle between the one magnetically inert material (small magnetic permeability) and that customary for discs of magnetorheological clutches.

Thus a moderately weak magnetic short circuit is consciously caused. Thus a magnetic flux arises in the disc closest to the end face which is restricted by its saturation so that the majority of the magnetic flux has to move to the next disc and the next but one disc and so on. In this way the magnetic flux is uniformly distributed over all discs in a simple natural manner by the optimum choice of the magnetic permeability. The discs consist of a unitary suitably selected material.

Altogether, the magnetic field lines extend from one part of the end face of the first yoke through a part of the area of the discs at least until they are deflected by the yoke lying at the other side, pass through the remaining part of the discs and back into the remaining part of the end face. The short circuit fluxes are distributed across all discs. Only the end faces of the yokes are separated from one another across a zone of small magnetic permeability; the parts lying radially outside and inside the discs also consist of a material of low magnetic permeability. In this way it is possible to transmit a maximum of torque with a minimum of current consumption.

The discs preferably consist of a material whose magnetic permeability is approximately the same as that of the magnetorheological fluid. Thus the field line density is particularly uniform in the entire fluid filled space and in the discs.

In a further development of the invention at least one further magnet coil is also associated with the second yoke. The second yoke serves not only for the deflection of the field lines but rather also contributes to the build-up of the magnetic field. The magnetic field is thereby even more homogeneous and the magnetic short circuits are better distributed onto the discs.

There are several preferred embodiments for the arrangement of the magnet coils. In a first preferred embodiment, the at least one magnet coil associated with the yokes is a single magnet coil having the axis of rotation as the winding axis and the yoke is a toroid surrounding it which forms the ring-like end face. This is particularly simple to manufacture because only a single magnet coil is required and produces a very uniform magnetic field because the field lines are largely equidistant.

In a second preferred embodiment, a plurality of magnet coils uniformly distributed over the periphery is associated with the yokes, with the winding axes and the magnetic cores being radially directed with respect to the axis of rotation and with the magnet coils being connected over a large area with the yoke or with a part thereof. This has the advantage of smaller magnet coils with a smaller and lighter core because a specific member of turns is required for a specific magnetic field strength which signifies short coil wire lengths for the small diameter of the magnet coils and a smaller ohmic resistance. It helps in saving current.

In a third preferred embodiment of the invention, the first yoke is connected to the stationary part and adjoins a circular region of the secondary part of high permeability. This makes it possible to do away with the slip contacts for the current supply to the magnet coil and more intensive cooling of it is possible; however, at the cost of an additional air gap. The second yoke can then, insofar as it only serves for the deflection of the magnetic fields, rotate with the secondary part. If it is also equipped with magnet coils then it is advantageous if it is also connected to the stationary part and borders on a circular ring-like region of high permeability of the secondary part. Finally it lies within the context of the invention to execute the individual yokes and/or coil cores "of sheet metal" that is to say of stacks of metal sheets. Higher magnetic flux densities, i.e. smaller coils can be achieved because of the omission of eddy currents.

DRAWINGS

Figure 2:
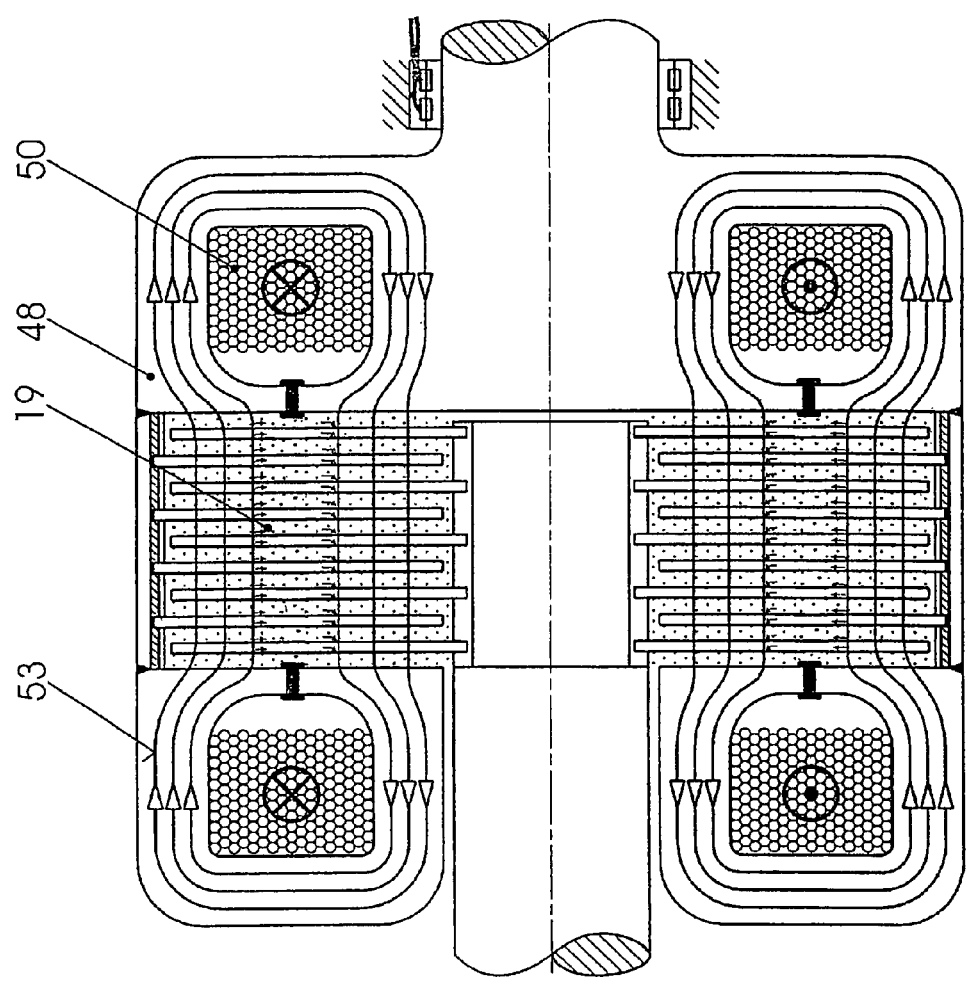
Figure 3:
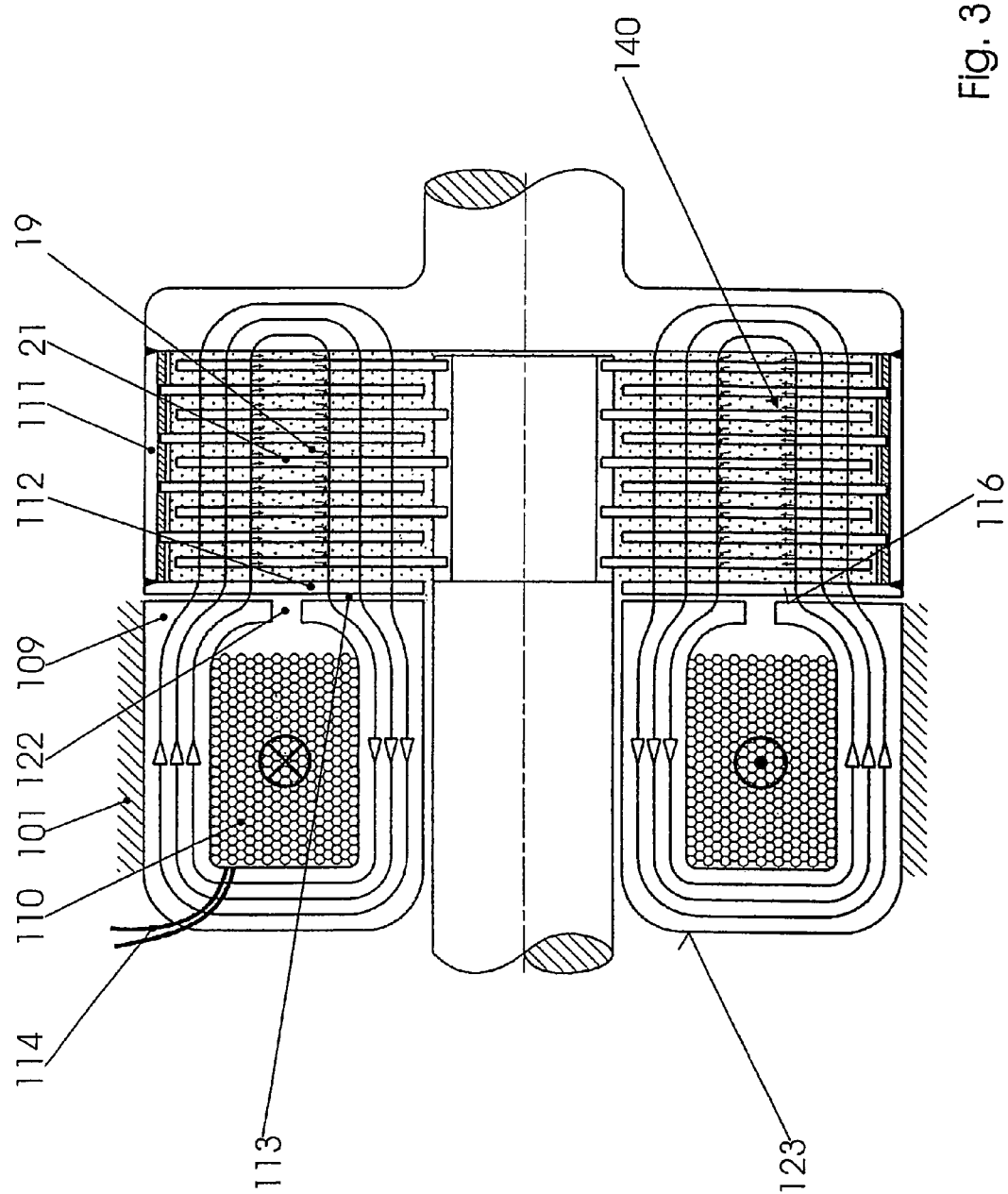
Figure 4:
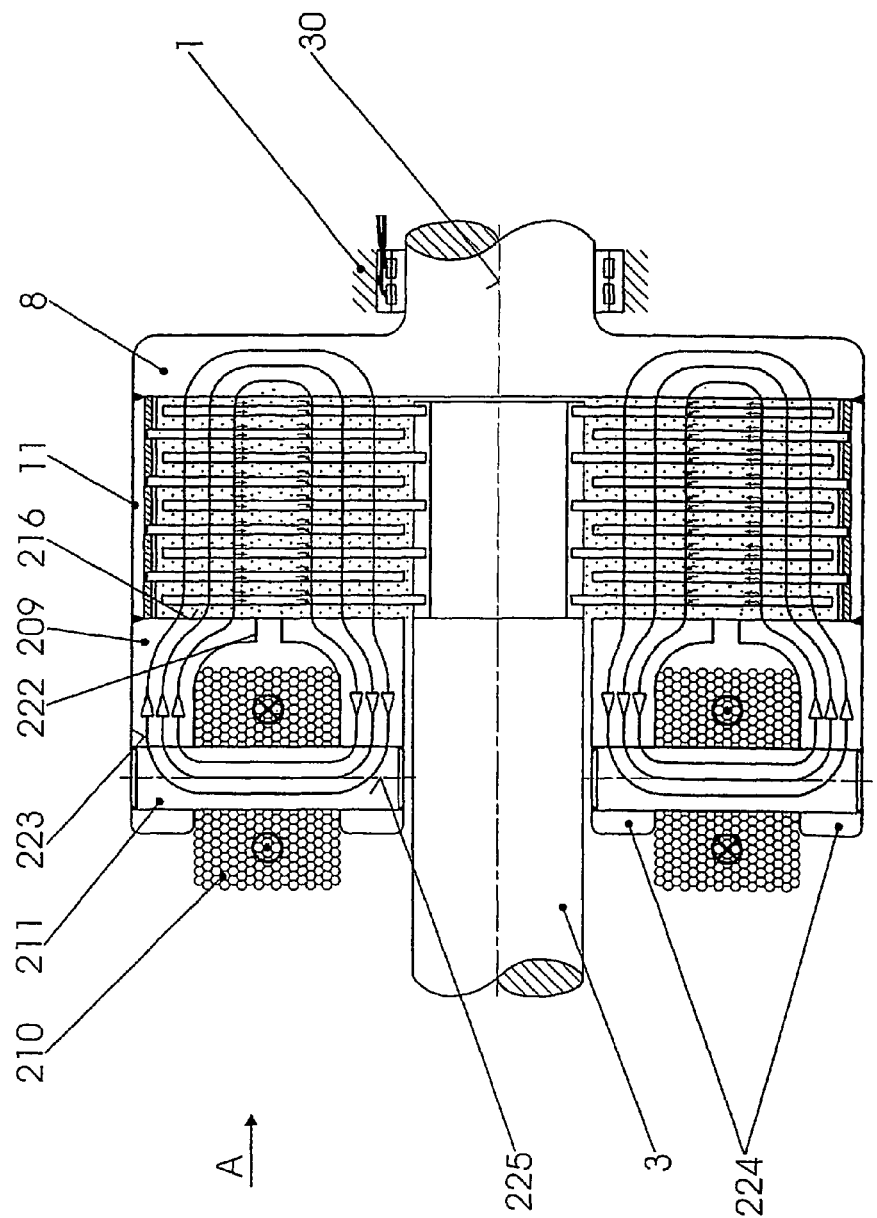
Figure 5:
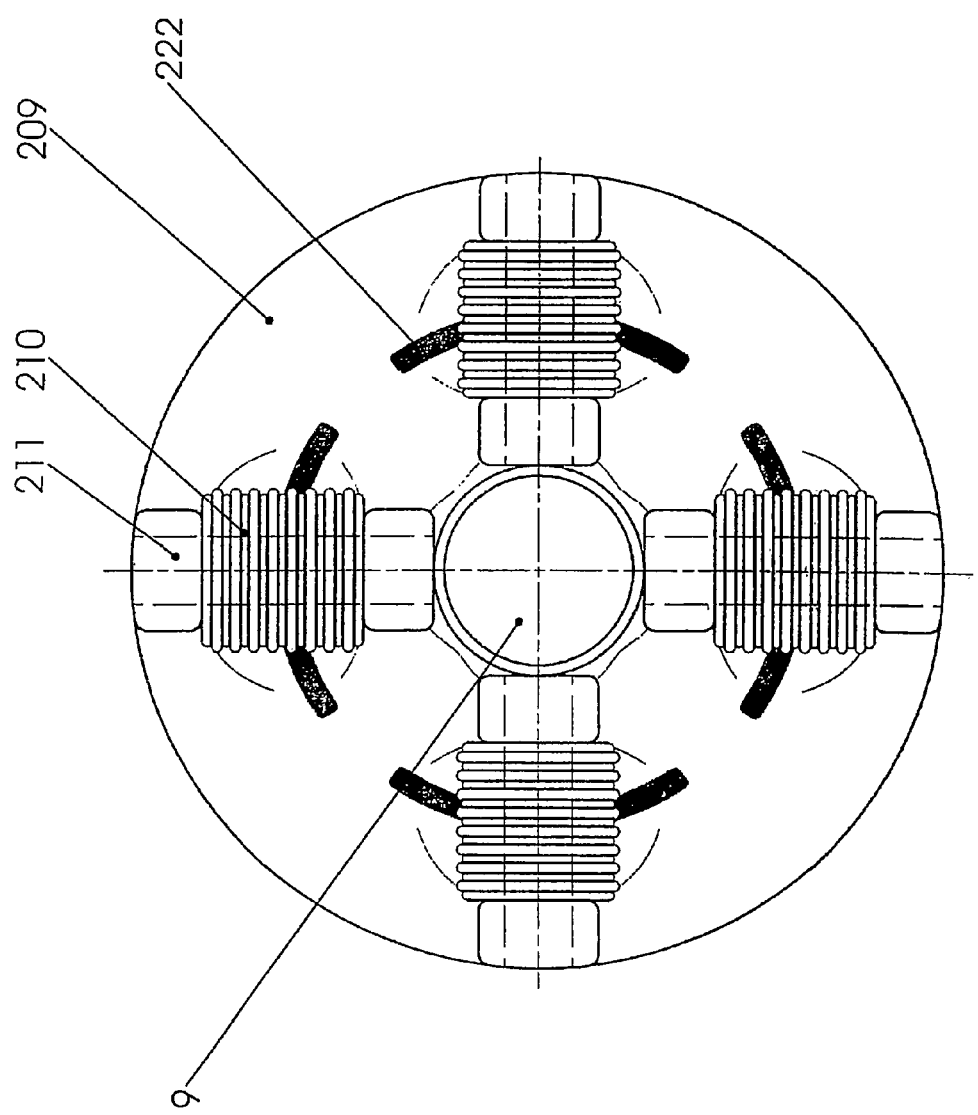
Figure 6:
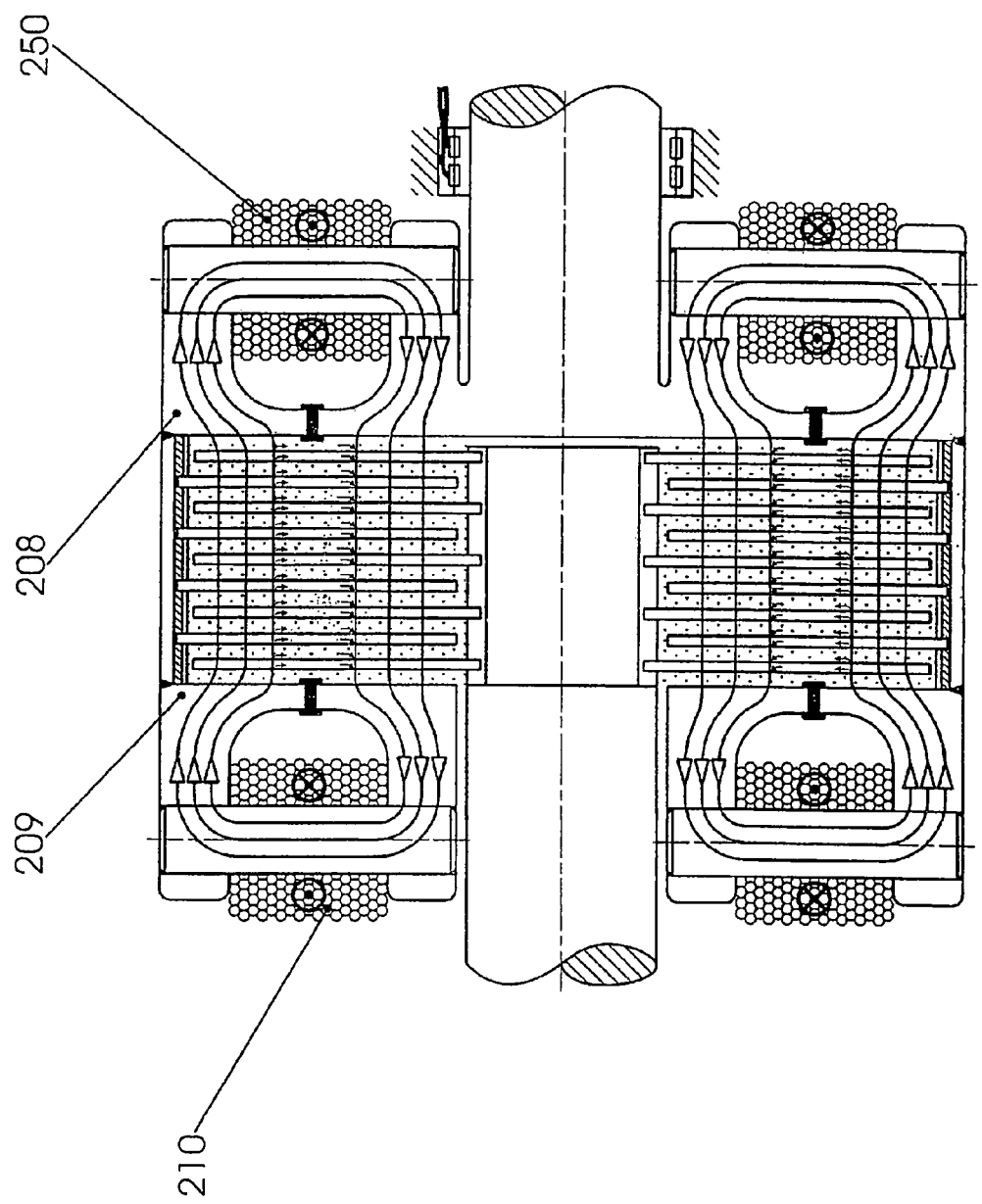
Figure 7:
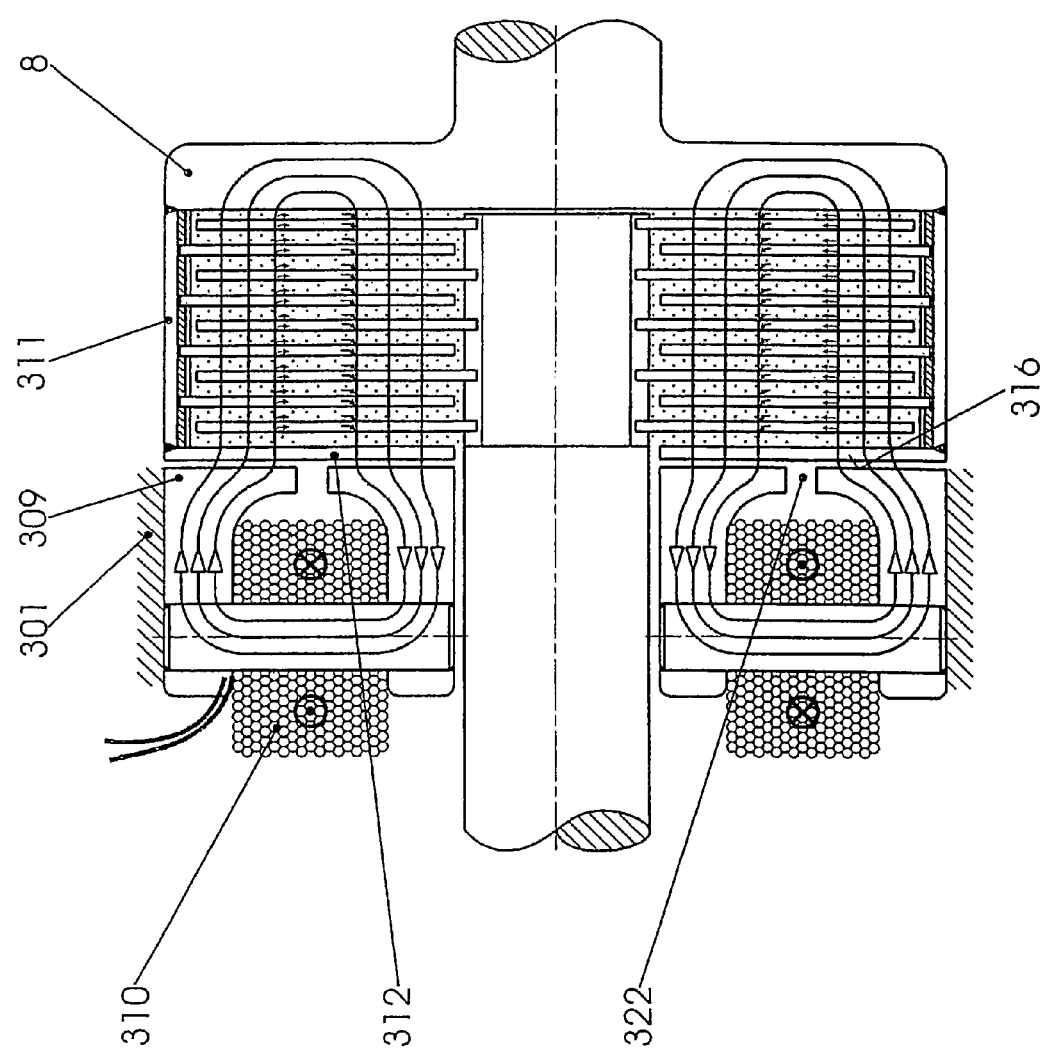

FIG. 1 is a longitudinal section through a first embodiment of the subject of the invention, FIG. 2 is a longitudinal section through a second embodiment of the subject of the invention, FIG. 3 is a longitudinal section through a variant of the first embodiment, FIG. 4 is a longitudinal section through a third embodiment, FIG. 5 is a view in accordance with A in FIG. 4, FIG. 6 is a longitudinal section through a fourth embodiment, and FIG. 7 is a longitudinal section through a variant of the third embodiment.

DETAILED DESCRIPTION

In FIG. 1 only the collar of the stationary part 1 is shown which produces the slip contact 2 for the supply of the electrical current to the magnet coil or coils. The torque transmission in the clutch takes place between a primary part 3 and a secondary part 6. The primary part 3 includes primary shaft 18 and a number of primary discs 4, here the inner discs, which sit in rotationally fixed manner on the primary shaft 18 by means of coupling teeth 5. The secondary part 6 includes a secondary shaft 7, which terminates in a second yoke 8, a first yoke 9 having a magnet coil 10 and also a number of secondary discs 14.

First yoke 9 and second yoke 8 are firmly connected together by an outer wall 11, with the outer wall 11 consisting of a material of low magnetic permeability or having a layer of such a material. A number of secondary discs 14 are rotationally fixedly connected to the outer wall 11 by their coupling teeth 15. Primary discs 4 and secondary discs 14 are alternately disposed between a first end face 16 of the first yoke 9 and a second end face 17 of the second yoke 8. The secondary discs 14 are fixedly positioned in the axial direction by distance rings 20. The primary discs 4 are displaceable in the axial direction. If the liquid gap between the primary discs 4 and secondary discs 14 is to be precisely set then non-magnetic spacing discs (not shown) are to be provided. Both the primary discs 4 and also the secondary discs 14 consists of a material having a magnetic permeability which lies between 0.6 and 1.2 Tesla. Such materials are for example iron nickel sinter alloys or nickel iron alloys such as are marketed by the company Vakuumschmelze under the names "Mumetall"® or "Permenorm"®. "Mumetall"® reaches the saturated state at 0.75 to 0.8 Tesla, "Permenorm"® at 1.2 Tesla. By way of comparison: a steel which is normally used for such discs has a magnetic saturation range of over 2 Tesla, a customary constructional steel one of around 1.7 Tesla, austenitic steel, aluminium or customary plastic one of approximately zero and a magnetorheological fluid one of 0.8 to 1 Tesla.

The two end faces 16, 17, the primary shaft 18 and the outer wall 11 enclose a space 19 which is filled with a magnetorheological fluid. The required seals are not shown. The first yoke 9 is subdivided by a zone 22 of low magnetic permeability into a radially outer zone and into a radially inner zone so that no magnetic short circuit exists in the yoke itself. In this way the magnetic field lines 23 are introduced equidistantly and parallel into the disc pack and redirected into the likewise subdivided second yoke 8. In the individual discs and in the individual discs filled with magnetorheological fluid and in the intermediate spaces filled with magnetorheological fluid short circuit field lines 40 branch off from the field lines which corresponds to a uniformly distributed, weak, magnetic short circuit.

A second embodiment in accordance with FIG. 2 is distinguished from that of FIG. 1 only in that the second yoke 48 also includes a (second) magnet coil 50 instead of the simple second yoke 8, which only serves to deflect the field lines. In this way the magnetic field is so to say spanned from both sides so that the field lines 53 pass through the space 19 even more uniformly distributed.

FIG. 3 shows a variant of the embodiment of FIG. 1 from which it is distinguished in that the magnet coil 110 is stationary. Only the different parts are provided with analogous reference numerals which are increased by 100. The stationary part 101 is here a part of the housing and the first yoke 109 is fixed relative to the housing, i.e. does not rotate with the primary part or with the secondary part. The yoke 109 itself is again built up precisely as shown in FIG. 1. It surrounds the circular ring-like magnet coil 110 when seen in the axial and normal section, at the inside, at the outside and at an end face. The side facing the space 19 is interrupted in the radius of the zones 21. In distinction from FIG. 1, an axially normal inwardly directed wall 112 adjoins the outer wall 111 of the secondary part in order to close off the fluid filled space 19. This wall 112 also has a zone 122 of small magnetic permeability. An air gap 113 arises between the wall 112 and the first yoke 109 and can be kept very small. Since the magnet coil 110 does not rotate in this embodiment, no slip contacts are required for the power supply, on the contrary this takes place from the housing via lines 114.

A third embodiment in accordance with FIG. 4 is distinguished from that of FIG. 1 essentially only by the different arrangement of the magnet coils, here at least two at the same angular spacing from one another. The magnet coils 210 here have a radially aligned winding axis 225 and a likewise radially aligned magnetic core 211. The magnetic cores 211 are held at their radially inner and outer ends by ears 224, which merge into the first yoke 209 with the smoothest possible round transition. The end face 216 is again interrupted by a zone of small magnetic permeability 222 which is here a circular ring-shaped air gap. The zone could also be formed of plastic or another non-magnetic material. This can be clearly recognized in FIG. 5 in end view.

A fourth embodiment in accordance with FIG. 6 is distinguished from that of FIG. 4 only in that a second yoke 208 is provided instead of the second yoke 8 which only serves for the deflection, with the second yoke 208 being formed in precisely the same way as the first yoke 209 of FIG. 6. One recognizes that the magnet coils 210 are here smaller in order to achieve the same field strength because they are indeed provided at both sides of the discs.

FIG. 7 shows another variant of the embodiment of FIG. 4 from which it is only distinguished in that a stationary yoke 309 is provided instead of the yoke 209 co-rotating with the secondary part. It is again fixedly connected to the stationary part, i.e. to the housing 301, and the axially normal wall 312 again adjoins the outer wall 311 of the secondary part in order to sealingly close off the space filled with the fluid.

Despite a plurality of described embodiments further embodiments and variants are conceivable. Thanks to selection of the magnetic permeability of the material of the discs in accordance with the invention the desired uniform distribution of the field lines is achieved in the space containing the discs and the maximum conversion of the electrical current required for the excitation of the magnetic field into transmitted torque is achieved. Thanks to this the magnetic field is also broken down faster for the quick disengagement of the clutch.

The invention claimed is:

1. A magnetorheological clutch comprising:
a stationary part, a rotatable primary part with primary discs, and a secondary part having secondary discs which surrounds the primary part and is rotatable about a common axis of rotation;
a space containing a magnetorheological fluid formed between the primary part and the secondary part in which the primary discs and the secondary discs alternate in the axial direction; and
a regulatable magnetic field which acts on the magnetorheological fluid, wherein
a) a plurality of magnetic coils are axially arranged in front of or behind the space containing the magnetorheological fluid and are operable to build up the magnetic field in a first yoke;
b) the first yoke has an end face parallel to the discs which is adjoined by the space containing the magnetorheological fluid, wherein magnetic field lines emerge substantially at right angles from said end face and enter into it respectively, and
c) a second yoke having an end face parallel to the discs is provided at the side of the space remote from the first yoke,
wherein the discs are plates which consist of a material having a magnetic permeability in the range from 0.6 to 1.2 Tesla, and wherein the plurality of magnetic coils are uniformly distributed over the periphery and each is associated with one of the first and second yokes, said magnetic coils each having a winding axis and magnetic core radially aligned with the respective axis of rotation.

2. A magnetorheological clutch in accordance with claim 1, wherein the magnetic permeability of the discs is approximately the same as that of the magnetorheological fluid.

3. A magnetorheological clutch in accordance with claim 1, wherein at least one of the plurality of magnetic coils is associated with the first yoke and the second yoke.

4. A magnetorheological clutch in accordance with claim 1, wherein the magnet coil associated with a corresponding one of the first and second yokes is a single magnet coil with the axis of rotation as the winding axis, and wherein the yoke is a torus surrounding it which forms the end face.

5. A magnetorheological clutch in accordance with claim 1, wherein the magnetic cores are connected over a large area with at least part of the corresponding one of the first and second yokes.

6. A magnetorheological clutch in accordance with claim 1, wherein the first yoke is connected to the stationary part and borders on a circular ring-like region of high magnetic permeability of the secondary part.

7. A magnetorheological clutch in accordance with claim 1, wherein at least one of the first yoke and/or of the second yoke and/or of the magnetic cores consist of a sheet metal stack.

8. A magnetorheological clutch comprising:
a primary part having a plurality of primary discs;
a secondary part having a plurality of secondary discs and which is rotatable about an axis of rotation;
a space defined between the primary and secondary parts containing a magnetorheological fluid and within which the primary and secondary disks alternate in an axial direction;
a first yoke having a first end face parallel to the discs and located adjacent to a first end of the space containing the magnetorheological fluid;
a second yoke having a second end face parallel to the discs and located adjacent to a second end of the space containing the magnetorheological fluid; and
a regulatable magnetic field acting on the magnetorheological fluid and including a plurality of magnetic coils axially arranged adjacent to the first end of the space containing the magnetorheological fluid and operable to build up the magnetic field in the first yoke, wherein the magnetic coils are uniformly distributed over the periphery of the first yoke and each includes a winding axis and a magnetic core radially aligned with the axis of rotation.

9. The magnetorheological clutch of claim 8 wherein the primary and secondary discs are plates made from a material having a magnetic permeability in the range of 0.6 to 1.2 Tesla.

10. The magnetorheological clutch of claim 8 wherein the second yoke is interconnected to the secondary part, wherein the first yoke is interconnected to the second yoke such that the first and second yokes rotate with the secondary part about the axis of rotation, and wherein the plurality of magnetic coils are mounted in the first yoke.

11. The magnetorheological clutch of claim 10 wherein an outer wall member interconnects the first yoke to the second yoke, and wherein the secondary discs are fixed to the outer wall member for rotation with the secondary part.

12. The magnetorheological clutch of claim 11 further including a plurality of second magnetic coils axially arranged adjacent to the second end of the space containing the magnetorheological fluid and which are operable to build up the magnetic field in the second yoke.

13. The magnetorheological clutch of claim 12 wherein each of the second magnetic coils includes a winding axis and a magnetic core radially aligned with the axis of rotation.

14. The magnetorheological clutch of claim 8 wherein the first yoke is fixed to a stationary member, wherein the second yoke is fixed to the secondary part for rotation about the axis of rotation relative to the first yoke, and wherein the plurality of magnetic coils are each mounted in the stationary first yoke.

15. The magnetorheological clutch of claim 14 wherein an outer wall member interconnects a radial wall member to the second yoke, wherein the radial wall member defines the first end of the space containing the magnetorheological fluid and the first end face of the first yoke is in close proximity to the radial wall member, and wherein the secondary discs are fixed for rotation with the outer wall member.

16. The magnetorheological clutch of claim 15 further including a plurality of second magnetic coils axially arranged adjacent to the second end of the space containing the magnetorheological fluid and which are operable to build up the magnetic field in the second yoke.

17. The magnetorheological clutch of claim 16 wherein each of the second magnetic coils includes a winding axis and a magnetic core radially aligned with the axis of rotation.

* * * * *